United States Patent
Kamm

(10) Patent No.: US 7,111,474 B2
(45) Date of Patent: Sep. 26, 2006

(54) DEVICE FOR REMOVING GAS FROM FREEZING INSTALLATIONS BY SUCTION

(75) Inventor: Volker Kamm, Taufkirchen (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/971,691

(22) Filed: Oct. 25, 2004

(65) Prior Publication Data

US 2005/0120736 A1 Jun. 9, 2005

Related U.S. Application Data

(63) Continuation of application No. PCT/EP03/04016, filed on Apr. 17, 2003.

(30) Foreign Application Priority Data

Apr. 24, 2002 (DE) ............................ 102 18 298

(51) Int. Cl.
*F25D 17/02* (2006.01)
(52) U.S. Cl. .................. 62/374; 62/380; 198/626.1; 198/952
(58) Field of Classification Search .............. 62/63, 62/64, 186, 266, 373, 374, 380; 198/626.1, 198/952
See application file for complete search history.

(56) References Cited

U.S. PATENT DOCUMENTS

| | | | |
|---|---|---|---|
| 3,553,973 A | | 1/1971 | Moran |
| 3,824,806 A | * | 7/1974 | Wagner ................... 62/374 |
| 4,086,783 A | * | 5/1978 | Wagner et al. ............ 62/374 |
| 4,086,784 A | * | 5/1978 | Wagner ................... 62/374 |
| 4,173,127 A | * | 11/1979 | Sandberg .................. 62/374 |
| 4,276,753 A | * | 7/1981 | Sandberg et al. ........... 62/186 |
| 4,350,027 A | * | 9/1982 | Tyree, Jr. ................. 62/374 |
| 4,448,029 A | * | 5/1984 | Keller ..................... 62/63 |
| 4,555,914 A | * | 12/1985 | Kanto et al. ............... 62/374 |
| 4,589,264 A | * | 5/1986 | Astrom .................... 62/374 |
| 4,739,623 A | * | 4/1988 | Tyree et al. ............... 62/63 |
| 4,866,946 A | * | 9/1989 | Klee ....................... 62/63 |
| 4,947,654 A | | 8/1990 | Sink et al. |
| 4,955,206 A | * | 9/1990 | Lang et al. ................ 62/380 |
| 5,605,049 A | * | 2/1997 | Moore et al. .............. 62/63 |
| 5,702,245 A | | 12/1997 | London |
| 2001/0025495 A1 | | 10/2001 | Newman et al. |

FOREIGN PATENT DOCUMENTS

EP 0667503 A1 * 8/1995

* cited by examiner

*Primary Examiner*—Mohammad M. Ali
(74) *Attorney, Agent, or Firm*—Crowell & Moring LLP

(57) ABSTRACT

The invention relates to a device for cooling products to be cooled, said device comprising a carrier for products to be cooled, a housing, a coolant supply for supplying coolant into the housing, and at least one opening of the housing for supplying and extracting the product to be cooled. At least one channel is provided in the region of the opening for receiving the coolant, said channel being actively connected to a suction-side connection of a fan and comprising an inlet which is arranged outside the housing, adjacent to the opening thereof. Preferably, two channels are provided, said channels being arranged opposite each other, adjacent to the opening, and being embodied in such a way that essentially only heated, gaseous coolant, i.e. which has already fulfilled its cooling purpose, is carried off, while removal by suction of the coolant which has not yet received the heat quantity is prevented from the inside of the housing.

32 Claims, 3 Drawing Sheets

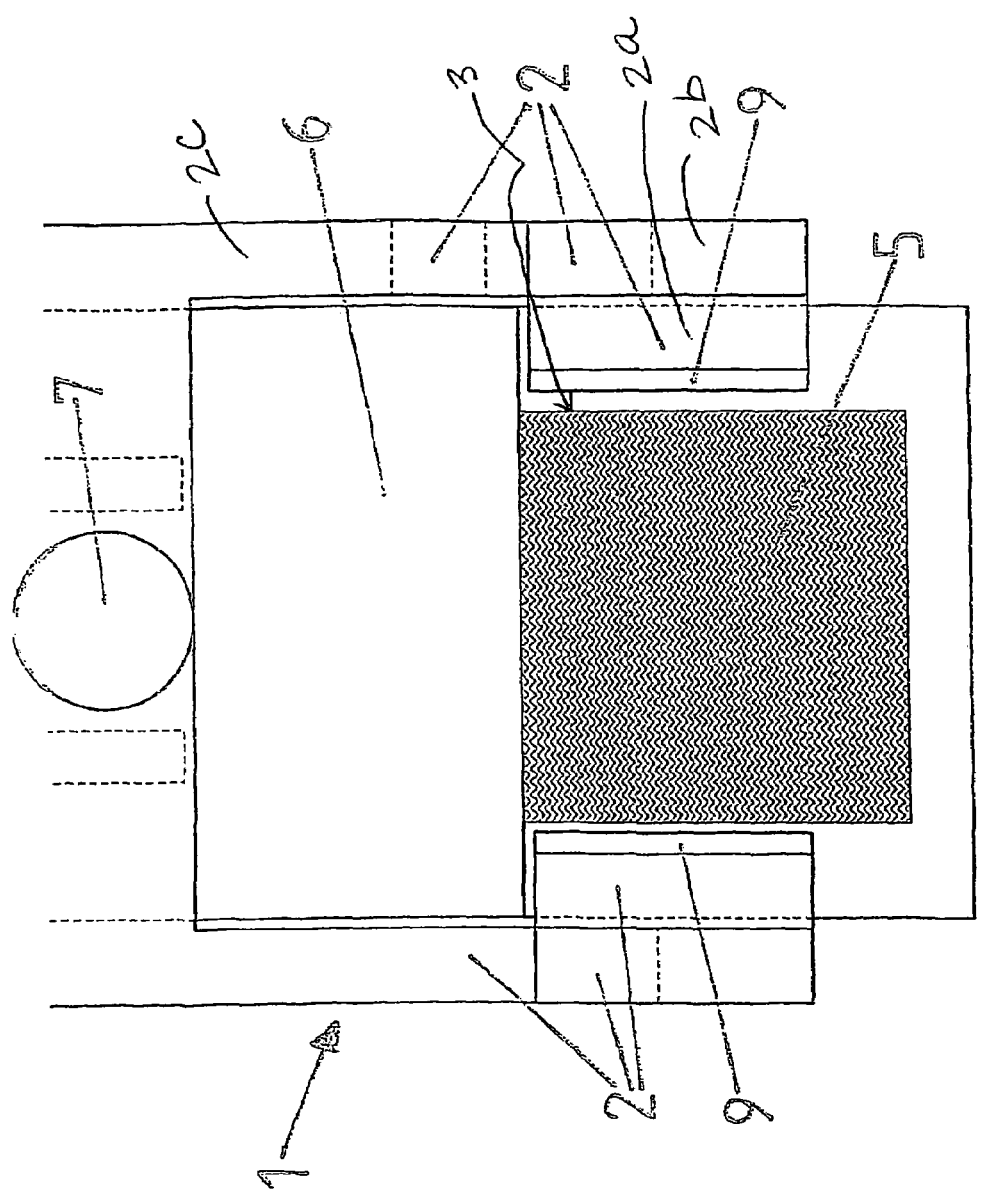

DEVICE FOR REMOVING GAS FROM FREEZING INSTALLATIONS BY SUCTION

This application is a continuation of International Patent Application No. PCT/EP03/04016 filed on Apr. 17, 2003, designating the United States of America, the entire disclosure of which is incorporated herein by reference. Priority is claimed based on German Patent Application No. DE 102 18 298.1 filed Apr. 24, 2002.

BACKGROUND AND SUMMARY OF THE INVENTION

The invention relates to a device for cooling products to be cooled, the device having a carrier for the products to be cooled, a housing and an inlet for supplying a cooling medium into the interior of the housing as well as at least one opening of the housing for supplying and extracting the product to be cooled.

A number of measures are known for directing gas in the case of installations for cooling and freezing products to be cooled. After its use for cooling purpose, the cooling medium, as a rule, leaves the installation in a gaseous state. Preferably, nitrogen or carbon dioxide can be used as cooling media; they are particularly suitable for this purpose as low-temperature gases.

The term "cooling", on the one hand, describes the cooling to temperatures above the freezing point, for example, the cooling of heat-treated food products from +70° C. to +2° C. However, "cooling" comprises particularly also freezing and deep freezing. "Deep freezing" means that the food products are subjected to a refrigerating medium of a sufficiently low temperature for a sufficient period of time, so that, following the freezing process, a core temperature exists which is clearly below the freezing point of water; as a rule, below a temperature of −18° C.

The refrigerating medium can, for example, be low-temperature gas (liquefied or gaseous) or cooled air. As a rule, the heat exchange takes place essentially by way of convective processes. When liquefied gas is used, it also takes place by way of heat conduction by direct contact of the cooling medium with the product to be cooled.

Preferably, the gas is therefore introduced into the cooling device in a liquefied state and is vaporized by a thermal transfer from the product to be cooled to the cooling medium. The then warmer and gaseous cooling medium is discharged from the cooling device. The discharge should normally not take place into the environment of the installation because the above-mentioned gases displace the air and thereby would endanger people in the surroundings of the installation. Thus, for reasons of safety, a removal of the gas has to be ensured from the working environment of such a cooling device.

For this purpose, it is known to remove by suction the gas in the interior of a cooling device or directly above or below the feeding or delivery point for the products to be cooled. However, these measures have the common disadvantage that a suction is oftentimes generated inside the cooling device and, as a result, not only heated gas is removed by suction, thus gas which has already served its cooling purpose, but also low-temperature gas which, had it remained in the cooling device longer, would still have been able to absorb heat.

It is therefore an object of the invention to design a device such that an efficient utilization of the used cooling medium is achieved; in particular, that the removal is low with respect to losses for the cooling medium.

This object is achieved in that at least one channel or conduit for receiving cooling medium is provided in the area of the opening, this channel being operatively connected with a suction-side connection of a fan and having an inlet opening arranged outside the housing laterally next to the opening of the housing.

A channel arranged in such a manner has the advantage that the cooling medium (for example, nitrogen or carbon dioxide), which is preferably fed in a liquefied state to the device for being cooled and evaporates as a result of heat transfer from the products to be cooled to the cooling medium, is removed by suction immediately after exiting the housing. An important advantage consists of the fact that essentially only heated gaseous cooling medium, thus cooling medium which has already met its cooling purpose, is removed, while a removal by suction of cooling medium which has not yet absorbed the intended amount of heat from the interior of the housing is avoided.

This is also reliably avoided in the case in which the suction power of the fan is higher than the amount of heated cooling medium to be discharged per time unit. Specifically, in this case, ambient air from the environment of the device is taken in as the differential quantity, the taking-in of the ambient air being considerably promoted by the arrangement of the inlet opening of the channel.

For this case, according to an advantageous further development of the invention, an intake connection piece for taking in ambient or environmental air is additionally provided in front of the fan. As a result, an ice formation is avoided inside the fan. An ice formation may occur in the fan if the moisture content of the taken-in gas is too high. For this reason, dry ambient air is preferably admixed as required.

Another advantage consists of the fact that, as a result of the lateral arrangement of the channel according to the invention, a contact is prevented between the products to be cooled and the condensation water caused by contact of the gas with the comparatively warm surface of the channel during the removal by suction in the channel.

The channel preferably has a rectangular cross-section. Particularly preferably, the inlet opening of the channel has a rectangular cross-section. The longer side of this rectangle is advantageously arranged essentially parallel to the longitudinal axis of the carrier of the products to be cooled.

This further development permits a very efficient discharge of the gas flowing out of the housing without influencing the flow conditions inside the opening. Particularly advantageously, this further development is also suitable for additionally facilitating the taking-in of a differential amount of ambient air. The case in which such a taking-in of ambient air is desirable was described above.

According to another advantageous further development of the invention, the channel has a round or elliptical cross-section. The advantage is the result of the adaptation of the cross-sectional shape of the channel to the geometry of the opening of the housing, so that a removal by suction is achieved which is as complete as possible.

The carrier of the products to be cooled is expediently constructed as a conveying belt. During the cooling, the products to be cooled are moved, for example, through a tunnel-type deep freezer or through a spiral deep freezer.

Another expedient further development of the invention provides a foil as a carrier for products to be cooled, which foil is preferably moved through the deep freezer like a conveying belt.

Another expedient embodiment of the invention provides a current of liquid nitrogen as a carrier for products to be cooled, which current flows through the deep freezer and moves the products to be cooled in a floating or immersing manner on or in the liquid nitrogen.

In another advantageous embodiment of the invention, the channel has a slope from the inlet opening, which is arranged laterally next to the opening of the housing, down to a lowest point, at which a discharge connection piece is mounted for the discharging of liquid, particularly a discharge connection piece for discharging condensation water and/or cleaning solution. As a result, an undesirable contact of the liquid with the products to be cooled is reliably prevented.

According to a particularly expedient embodiment of the invention, two channels are provided, particularly two channels arranged laterally next to the opening and in a mutually opposite position. This results in the advantage of a uniform removal of the gas.

The invention has a number of additional advantages:

As a result of the removal by suction according to the invention, the flow conditions are not impaired in the interior of the housing in which the cooling is taking place, and no undesirable suction is generated in the interior of the housing. This permits a very efficient utilization of the cooling medium. The demand for cooling medium is clearly reduced in comparison to conventional solutions. The invention therefore offers important advantages in the fields of energy efficiency and of the economical use of operating media, such as cooling medium.

Furthermore, a large number of hygienic demands are met by means of the invention in a simple manner. In addition, care is taken that the personnel loading products to be cooled into the deep freezer are protected from injuries. Likewise, by means of the design of the removal by suction according to the invention, it is reliably prevented that products to be cooled which accidentally fall beside the conveying belt fall into the removal suction.

The invention as well as additional details of the invention will be explained in detail in the following by means of an embodiment illustrated in the drawings.

Other objects, advantages and novel features of the present invention will become apparent from the following detailed description of the invention when considered in conjunction with the accompanying drawings.

BRIEF DESCRIPTION OF THE DRAWINGS

FIG. 3 is a top schematic view of the device of FIGS. 1 and 2.

DETAILED DESCRIPTION OF THE DRAWINGS

As an example of a device according to the invention, the figures show a tunnel-type deep freezer 1 having two channels 2 for the removal by suction of the gas emerging from the opening 3.

Figure 1:
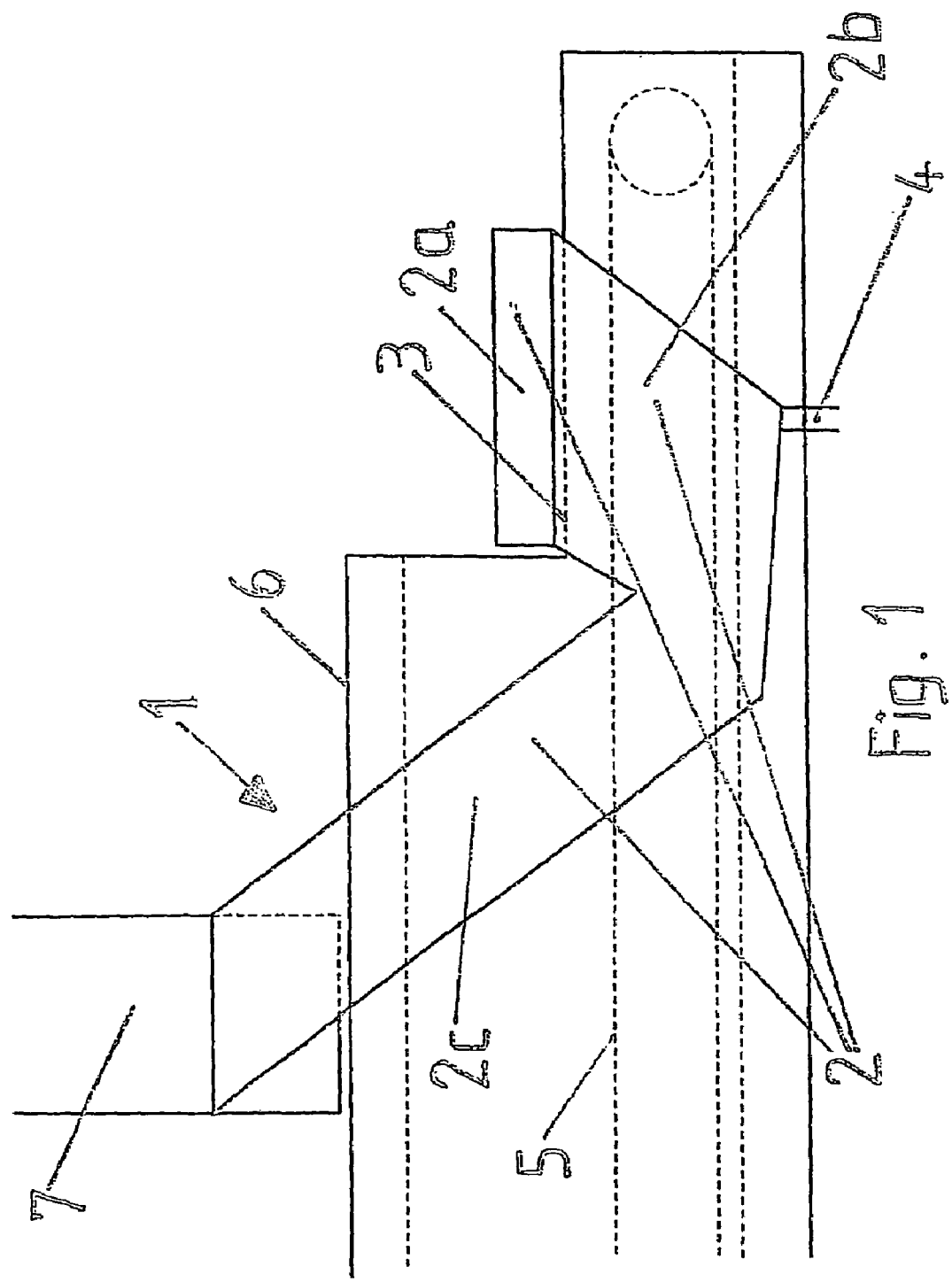
FIG. 1 is a lateral schematic view of a device constructed according to preferred embodiments of the invention.

Specifically, FIG. 1 illustrates a side of the channel 2 having an inlet section 2a with inlet opening 9, a descending section 2b, an ascending section 2c and a discharge connection piece 4 for condensation water. The products to be cooled (not shown) are cooled by means of a cooling medium (such as carbon dioxide) while being situated on a conveying belt 5. For this purpose, for example, liquid carbon dioxide is fed into the interior of the housing 6 of the tunnel-type deep freezer 1 and is subjected there to a heat exchange with the products to be cooled.

During this heat exchange, the cooling medium is vaporized by means of a heat transfer from the products to be cooled to the cooling medium, such as carbon dioxide. The carbon dioxide thus absorbs heat which is withdrawn from the products to be cooled, whereby the temperature of the products to be cooled is decreased and the temperature of the carbon dioxide is increased. As a result, the liquid carbon dioxide is vaporized. The gaseous carbon dioxide emerges from the housing 6 and is sucked into the inlet openings 9 of the two channels 2 which are in an operative connection with a fan (not shown) by way of a feeding pipe 7.

Advantageously, the two channels 2 in this example are brought together behind the ascending sections 2c and in front of the feeding pipe 7, so that they are both in an operative connection with the same fan. This leading-together section 8 is easily visible in FIG. 2.

An important advantage is the fact that essentially only the above-described heated and gaseous carbon dioxide which has already met its cooling purpose is taken in. A removal by suction of cooling medium, which has not yet absorbed the intended amount of heat, from the interior of the housing is avoided by the arrangement and further development of the inlet opening 9 according to the invention.

This is also reliably avoided in a case in which the suction power of the fan is greater than the amount of heated carbon dioxide to be discharged per time unit. Specifically, ambient air from the environment of the device is taken in this case as a differential quantity, the taking-in of ambient air being provided particularly by the elongated shaping of the inlet opening and of the cross-section of the two channels 2 as well as their lateral arrangement.

Figure 2:
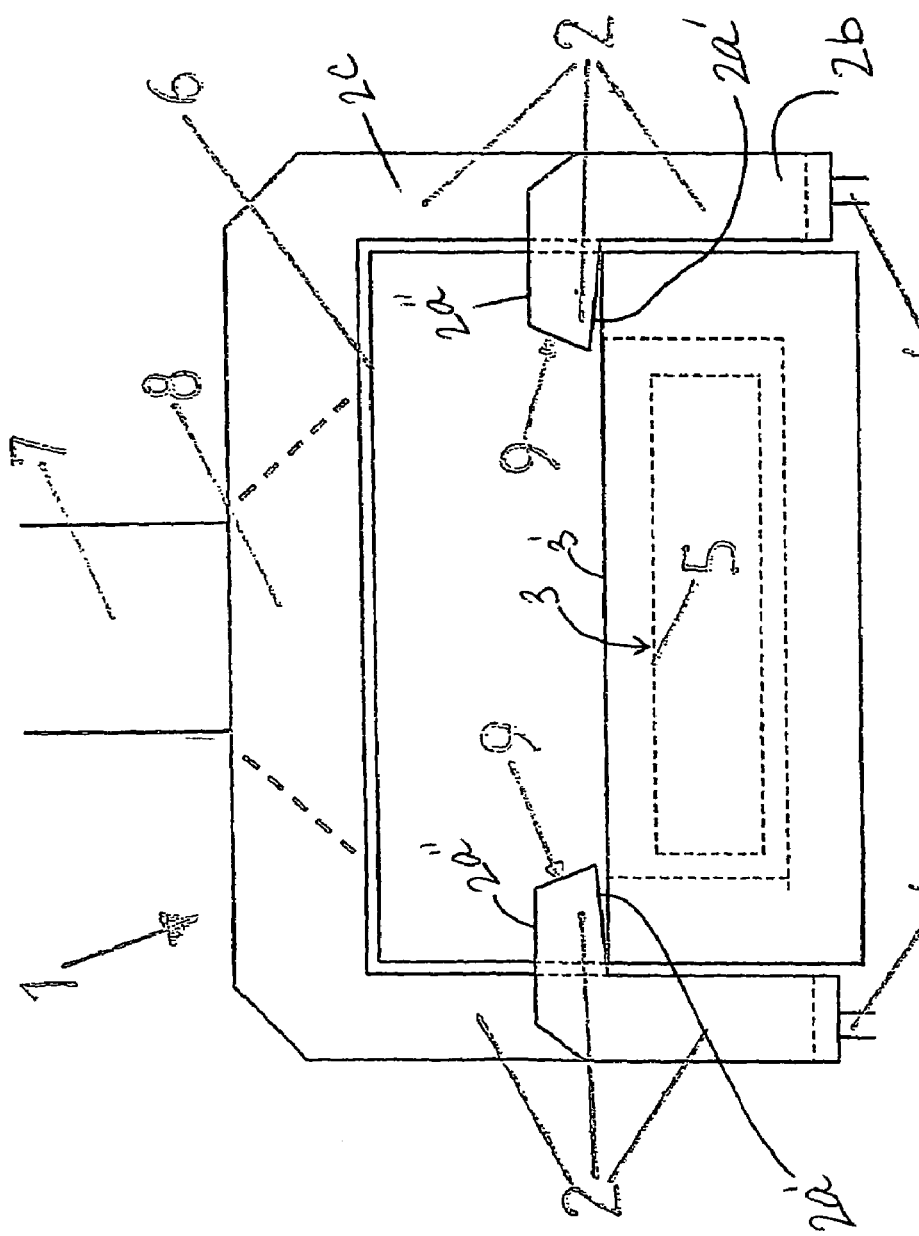
FIG. 2 is a frontal schematic view of the device of FIG. 1.

FIGS. 2 and 3 illustrate that the opening 3 breaches the housing 6 in a plane 3' which is spaced vertically from the conveying belt 5 and is arranged essentially parallel to the conveying belt 5, and the channels 2 with the inlet openings 9 are arranged at a narrow distance above this plane. In an also expedient embodiment, however, the channels 2 can directly adjoin this plane.

FIG. 2 additionally illustrates a particular advantageous embodiment of the inlet opening 9. The inlet opening 9 is bounded by the walls of the inlet section 2a such that the wall 2a" facing the bottom has its highest point at the inlet opening 9, and the wall 2a' situated opposite is arranged to be offset toward the outside and higher. As a result, it is achieved that a liquid condensing on the inner surface of the walls cannot flow out of the channel 2 through the inlet opening 9 but is forced to flow into the channel 2. This liquid, which originates from the products to be cooled, from the cleaning solution or from the moisture content of the gaseous carbon dioxide to be discharged, can be discharged from the channel 2 by way of the outflow connection piece 4.

FIG. 2 demonstrates another advantage of the invention: As a result of the flat design of the inlet section 2a, the opening 3, which is used for the admission and/or the removal of the products to be cooled, is easily accessible for the operating personnel loading the conveying belt 5, for example, with products to be cooled.

FIG. 3 is a top view of the lateral arrangement of the channels 2 on the left and on the right of the opening 3, through which a view onto the conveying belt 5 is provided. In this representation, the inlet opening 9 can also be seen from the open side, whereby a view is permitted in the area of the inlet opening 9 into the interior of the inlet section 2a of the channels 2. The opening of the housing is therefore flanked on the left and on the right by the inlet openings 9 of the channels 2.

Particularly when carbon dioxide is used, another advantage can be obtained: The avoidance of a suction effect inside the housing prevents an undesirable pressure drop in this area which could result in the formation of disturbing carbon dioxide snow.

The figures schematically illustrate the open end of a tunnel-type deep freezer. In a case in which a deep freezer is used which is open at both ends, it is advantageous to provide a removal by suction of cooling medium at both ends. Furthermore, in certain cases, it may also be advantageous in the case of several openings of the cooling device to provide a removal by suction only at one opening.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for cooling products to be cooled, having a carrier for the products to be cooled, a housing, a cooling medium supplier for supplying a cooling medium into the interior of the housing and at least one housing opening for supplying and extracting the products to be cooled,
    wherein a cooling medium channel for receiving cooling medium is provided in an area of the housing opening, said cooling medium channel being in an operative connection with a suction-side connection and having an inlet opening which is arranged outside the housing laterally next to the housing opening, the cooling medium channel having a downwardly sloping section downstream of the inlet opening and an upwardly sloping section downstream of the downwardly sloping section.

2. Device according to claim 1, wherein the cooling medium channel has a rectangular cross-section.

3. Device according to claim 1, wherein the inlet opening of the cooling medium channel has a rectangular cross-section, a longer side of this rectangle being arranged essentially parallel to a longitudinal axis of the carrier.

4. Device according to claim 2, wherein the inlet opening of the cooling medium channel has a rectangular cross-section, a longer side of this rectangle being arranged essentially parallel to a longitudinal axis of the carrier.

5. Device according to claim 1, wherein the carrier is constructed as a conveying belt.

6. Device according to claim 2, wherein the carrier is constructed as a conveying belt.

7. Device according to claim 3, wherein the carrier is constructed as a conveying belt.

8. Device according to claim 4, wherein the carrier is constructed as a conveying belt.

9. Device according to claim 1, wherein the downwardly sloping section slopes down from the inlet opening arranged laterally next to the housing opening toward a lowest point, at which a discharge connection piece is mounted for discharging liquid condensation water.

10. Device according to claim 2, wherein the downwardly sloping section slopes down from the inlet opening arranged laterally next to the housing opening toward a lowest point, at which a discharge connection piece is mounted for discharging liquid condensation water.

11. Device according to claim 3, wherein the downwardly sloping section slopes down from the inlet opening arranged laterally next to the housing opening toward a lowest point, at which a discharge connection piece is mounted for discharging liquid condensation water.

12. Device according to claim 5, wherein the downwardly sloping section slopes down from the inlet opening arranged laterally next to the housing opening toward a lowest point, at which a discharge connection piece is mounted for discharging liquid condensation water.

13. Device according to claim 8, wherein the downwardly sloping section slopes down from the inlet opening arranged laterally next to the housing opening toward a lowest point, at which a discharge connection piece is mounted for discharging liquid condensation water.

14. Device according to claim 1, wherein two of said cooling medium channels are provided which are arranged laterally next to the housing opening and opposite one another.

15. Device according to claim 2, wherein two of said cooling medium channels are provided which are arranged laterally next to the housing opening and opposite one another.

16. Device according to claim 3, wherein two of said cooling medium channels are provided which are arranged laterally next to the housing opening and opposite one another.

17. Device according to claim 5, wherein two of said cooling medium channels are provided which are arranged laterally next to the housing opening and opposite one another.

18. Device according to claim 8, wherein two of said cooling medium channels are provided which are arranged laterally next to the housing opening and opposite one another.

19. Device according to claim 9, wherein two of said cooling medium channels are provided which are arranged laterally next to the housing opening and opposite one another.

20. An assembly for cooling products, comprising:
    a cooler housing,
    a conveyor operable to convey products to be cooled and extending between a housing interior and a housing opening where the products can be placed on or removed from the conveyor,
    a cooling medium supplier for supplying a liquid cryogenic cooling medium to the housing interior to cool products carried by the conveyor, and
    a cooling medium extraction channel having an inlet opening disposed outside the housing laterally adjacent the housing opening, the cooling medium extraction channel adapted to extract gaseous cooling medium which has already performed cooling and having the inlet opening, a downwardly sloping section downstream of the inlet opening, and an upwardly sloping section downstream of the downwardly sloping section.

21. An assembly according to claim 20, wherein said conveyor is a conveyor belt which extends through the housing interior and through the housing opening.

22. An assembly according to claim 21, comprising a liquid discharge opening at a bottom of the cooling medium extraction channel.

23. An assembly according to claim 20, wherein the inlet opening is bounded by upper and lower facing wall sections of the cooling medium extraction channel, said lower wall section extending laterally into the housing opening by an amount greater than said upper wall section.

24. An assembly according to claim 23, wherein said lower wall section is sloped upwardly in a direction toward a laterally interior side of the housing opening.

25. An assembly according to claim 20, wherein the extraction channel inlet opening has a rectangular cross-section, a longer side of the rectangular cross section extending substantially parallel to a travel path of the conveyor.

26. An assembly according to claim 24, wherein the extraction channel inlet opening has a rectangular cross-section, a longer side of the rectangular cross section extending substantially parallel to a travel path of the conveyor.

27. An assembly according to claim 20, wherein two of said cooling medium extraction channels are provided, one at each lateral side of the conveyor.

28. An assembly according to claim 21, wherein two of said cooling medium extraction channels are provided, one at each lateral side of the conveyor.

29. An assembly according to claim 22, wherein two of said cooling medium extraction channels are provided, one at each lateral side of the conveyor.

30. An assembly according to claim 23, wherein two of said cooling medium extraction channels are provided, one at each lateral side of the conveyor.

31. An assembly according to claim 24, wherein two of said cooling medium extraction channels are provided, one at each lateral side of the conveyor.

32. An assembly according to claim 25, wherein two of said cooling medium extraction channels are provided, one at each lateral side of the conveyor.

* * * * *